(12) United States Patent  
Wright et al.

(10) Patent No.: US 7,655,069 B2
(45) Date of Patent: Feb. 2, 2010

(54) REMOVAL OF CARBON DIOXIDE FROM AIR

(75) Inventors: Allen B. Wright, Tucson, AZ (US); Klaus S. Lackner, Dobbs Ferry, NY (US); Eddy J. Peters, Surrey (CA)

(73) Assignee: Global Research Technologies, LLC, Waukesha, WI (US)

( * ) Notice: Subject to any disclaimer, the term of this patent is extended or adjusted under 35 U.S.C. 154(b) by 673 days.

(21) Appl. No.: 11/346,522

(22) Filed: Feb. 2, 2006

(65) Prior Publication Data

US 2006/0186562 A1 Aug. 24, 2006

Related U.S. Application Data

(60) Provisional application No. 60/649,341, filed on Feb. 2, 2005, provisional application No. 60/703,099, filed on Jul. 28, 2005.

(51) Int. Cl.
*B01D 53/14* (2006.01)

(52) U.S. Cl. .................. 95/92; 95/210; 95/211; 95/154; 95/285; 96/296; 96/298; 96/134; 96/154; 55/524; 55/DIG. 5; 55/DIG. 42

(58) Field of Classification Search ............ 95/210, 95/211, 92, DIG. 5, 154, 285; 96/296, 298, 96/DIG. 24, 134, 135, 108, 154; 55/524, 55/DIG. 5, DIG. 42

See application file for complete search history.

(56) References Cited

U.S. PATENT DOCUMENTS

| 1,031,799 | A |   | 7/1912  | MacKay |
|-----------|---|---|---------|--------|
| 3,645,072 | A | * | 2/1972  | Clapham ............... 96/153 |
| 4,566,221 | A |   | 1/1986  | Kossin ............... 47/41.12 |
| 4,906,263 | A | * | 3/1990  | von Blucher et al. ....... 96/135 |
| 5,070,664 | A |   | 12/1991 | Groh et al. ............... 52/177 |
| 5,277,915 | A | * | 1/1994  | Provonchee et al. ........ 424/485 |
| 5,385,610 | A | * | 1/1995  | Deerer et al. ............ 118/241 |
| 5,414,957 | A |   | 5/1995  | Kenney ............... 47/41.12 |
| 5,454,189 | A |   | 10/1995 | Graham et al. ........... 47/41.12 |
| 5,887,547 | A |   | 3/1999  | Caveny et al. ............ 119/174 |
| 6,136,075 | A |   | 10/2000 | Bragg et al. .............. 96/135 |
| 6,582,498 | B1 |  | 6/2003  | Sass et al. ................ 95/211 |
| 6,617,014 | B1 | * | 9/2003  | Thomson ................ 428/304.4 |
| 7,343,341 | B2 |  | 3/2008  | Sandor et al. ............. 705/37 |
| 7,415,418 | B2 |  | 8/2008  | Zimmerman ............... 705/1 |
| 2003/0145726 | A1 | | 8/2003 | Gueret et al. .............. 95/96 |
| 2004/0134353 | A1 | | 7/2004 | Gillingham et al. |
| 2005/0204915 | A1 | | 9/2005 | Sammons et al. |
| 2006/0013963 | A1 | | 1/2006 | Thomson ................ 427/487 |
| 2006/0186562 | A1 | | 8/2006 | Wright et al. |
| 2006/0249020 | A1 | | 11/2006 | Tonkovich et al. |
| 2007/0004023 | A1 | | 1/2007 | Trachtenberg |

FOREIGN PATENT DOCUMENTS

DE 19521678 6/1995

(Continued)

OTHER PUBLICATIONS

Notification Concerning Transmittal of International Preliminary Report on Patentability (Chapter 1 of the Patent Cooperation Treaty) International Application No. PCT/US2006/003646 Date of Mailing: Jan. 24, 2008.

Official Action for U.S. Appl. No. 11/209,962, dated Sep. 11, 2009, (16 pgs).

*Primary Examiner*—Duane Smith
*Assistant Examiner*—Ives Wu
(74) *Attorney, Agent, or Firm*—Hayes Soloway P.C.

(57) ABSTRACT

An air/liquid exchanger comprising an open-cell foam 102 supporting a liquid sorbent. The exchanger may be used for removing trace gaseous components from the air.

32 Claims, 14 Drawing Sheets

FOREIGN PATENT DOCUMENTS

| | | |
|---|---|---|
| DE | 20001385 | 1/2000 |
| EP | 0020055 | 5/1980 |
| GB | 1031799 | 2/1966 |
| JP | 58-122022 | 7/1983 |
| WO | WO 98/16296 | * 4/1998 |
| WO | WO 2005/108297 | 11/2005 |
| WO | WO 2006/009600 | 1/2006 |

* cited by examiner

1. FRAME
2. THRU-ROD SUPORTS
3. CORRUGATED TUBING
4. PLATE SPACERS
5. PLATES
6. LIQUID DIST. HEADER
7. CORRUGATION FITTING
8. PLASTIC TUBING
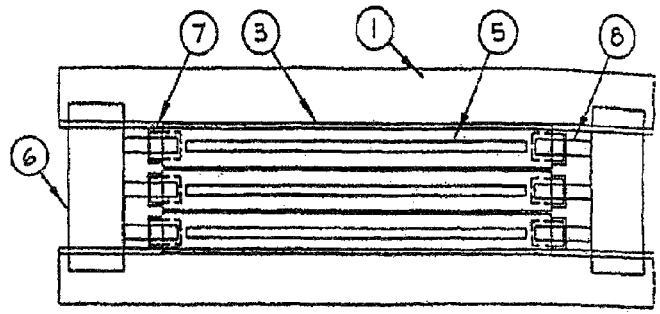
FIG. 2 - PRIOR ART
TOP
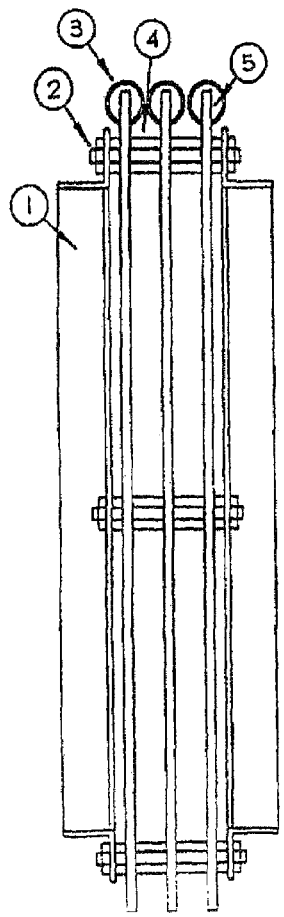
FIG. 3 - PRIOR ART
FRONT
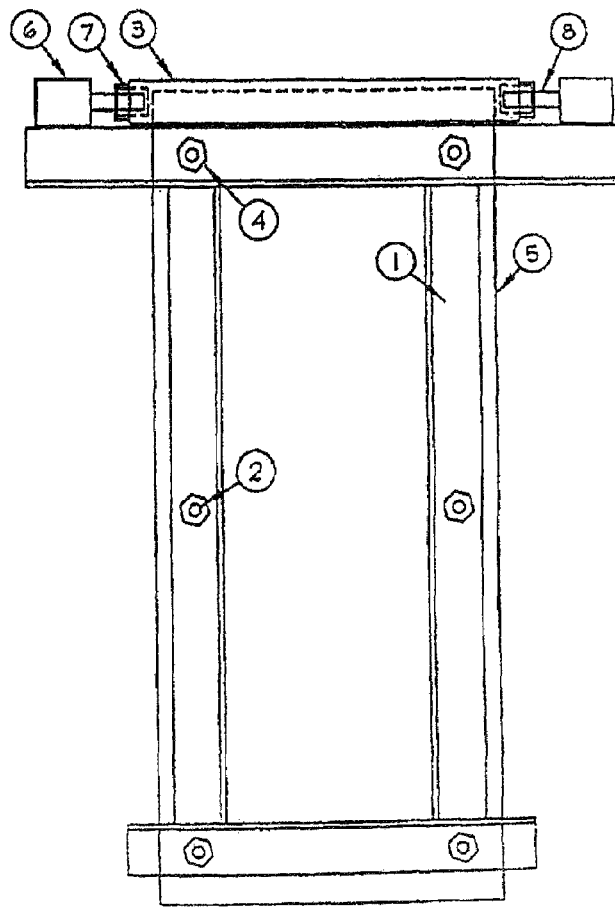
FIG. 4 - PRIOR ART
SIDE

FIG. 17(a)    COLLECTOR "OPERATING"
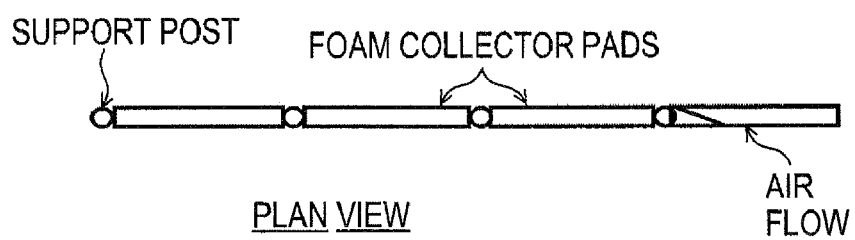
PLAN VIEW
FIG. 17(b)    COLLECTOR "OPEN"
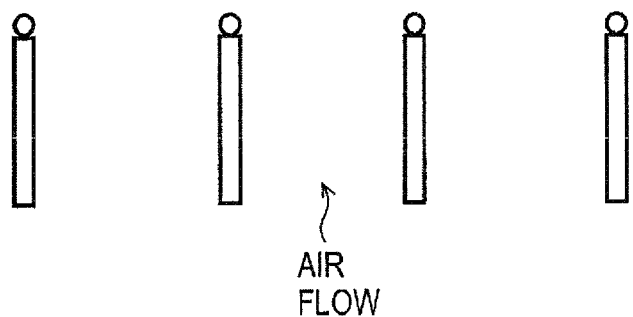
AIR FLOW
FIG. 17(c)    COLLECTOR "CLOSED"
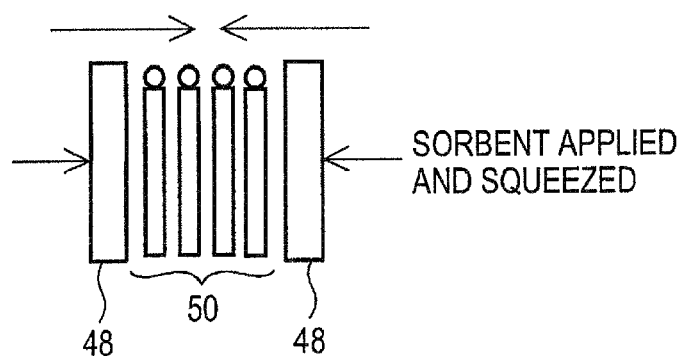
SORBENT APPLIED AND SQUEEZED

REMOVAL OF CARBON DIOXIDE FROM AIR

CROSS-REFERENCE TO RELATED APPLICATIONS

This application claims benefit of U.S. Provisional Application Ser. No. 60/649,341, filed Feb. 2, 2005, and of U.S. Provisional Application Ser. No. 60/703,099, filed Jul. 28, 2005.

BACKGROUND OF THE INVENTION

Description of the Prior Art

The present invention relates to removal of selected gases from air or other gas mixtures. The invention has particular utility for the extraction of carbon dioxide ($CO_2$) from air and will be described in connection with such utilities, although other utilities are contemplated.

Extracting carbon dioxide ($CO_2$) from ambient air would make it possible to use carbon-based fuels and deal with the greenhouse gas emissions of $CO_2$ after they have been released. Since $CO_2$ is neither poisonous nor harmful in parts per million quantities but creates environmental problems simply by accumulating in the atmosphere, it is admissible to remove $CO_2$ from air in order to compensate for an equally sized emission elsewhere and at different times. The overall scheme of air capture is well known.

The production of $CO_2$ occurs in a variety of industrial applications such as steel making and cement production. However the dominant source of $CO_2$ emissions is the combustion of hydrocarbon fuels for the generation of electricity, or for motive power in the transportation sector. The combustion of coal in power plants generates $CO_2$ as does the combustion of gasoline or diesel in cars, or of jet fuel in airplanes. Hydrocarbons are the main components of fuels that are combusted in combustion devices, such as engines. Exhaust gas discharged from such combustion devices contains $CO_2$ gas, which at present is simply released to the atmosphere. However, as greenhouse gas concerns mount, $CO_2$ emissions from all sources will have to be curtailed. One way to do this is to recapture the $CO_2$ from the ambient air.

Various methods and apparatus have been developed for removing $CO_2$ from air. For example, in one method and apparatus, air is washed with an alkaline solution in tanks filled with what are referred to as Raschig rings. For the elimination of small amounts of $CO_2$, gel absorbers have also been used. Although these methods are efficient in removing $CO_2$, they have a serious disadvantage in that pushing air through such devices consumes significant amounts of energy. Comparatively high pressure losses occur during these washing processes. $CO_2$ capture from air is negatively affected by additional energy consumption as this energy consumption usually causes additional $CO_2$ emissions. Most prior art processes also aim at creating $CO_2$ free gas, whereas the goal of $CO_2$ capture is to maximize $CO_2$ uptake rates. This difference in design goals leads to different approaches to $CO_2$ uptake. However, the invention described below may also be used to reduce energy consumption in conventional $CO_2$ removal apparatus.

Thus, the prior art methods result in the inefficient capture of $CO_2$ from air because these processes heat or cool the air, or change the pressure of the air by substantial amounts. As a result, the net $CO_2$ captured is reduced by emissions created in the process, or if this $CO_2$ is also captured the overall cost of the process is unnecessarily high.

Furthermore, while scrubber designs for separating $CO_2$ from air already exist, generally they are limited to packed bed type implementations whose goal is typically to remove all traces of an impurity from another gas. One such device, described in U.S. Pat. No. 4,047,894, contains absorption elements comprising porous sintered plates made of polyvinylchloride (PVC) or carbon foam arranged spaced from each other in a housing. Prior to the plates being assembled in the housing, potassium hydroxide is impregnated in the porous plates. Such a device has the disadvantage that the sorbent material used to separate $CO_2$ from air cannot be replenished without disassembling the device housing.

The foregoing description of the prior art derives primarily from our co-pending application Ser. No. 11/209,962, filed Aug. 22, 2005, the contents of which are incorporated by reference, in which we describe an air scrubber unit for removing $CO_2$ from an airflow that is maintained by a low-pressure gradient. Referring to FIGS. 1-4, the air scrubber units of our aforesaid provisional application consist of a wind collector 10 having lamella, which are two sheets or plates 5 covered in downward flowing sorbent bounding a thin air space, and a liquid sump 12. The two sheets forming the lamella preferably are separated by spacers 4 laced between the sheets on thru-rods 2 supported by a rigid frame 1 although the lamella may be supported in spaced relation by other means.

Sorbent is applied to the lamella sheets according to established state of the art approaches, e.g., spray nozzles or liquid extrusion, for example from corrugated tubing 3 fed from a header 6. The sorbent material flows down the lamella sheets, while the airflow passes between the thin airspace between the sheets. The contact between the air and the sorbent material causes a chemical reaction that removes $CO_2$.

The presently preferred choice of liquid sorbent is a sodium hydroxide solution, but other choices are possible. The design challenge is to provide a large surface area that can be exposed to the air, while being continuously wetted with a sorbent refresh rate that keeps up with the uptake rate of $CO_2$. For most strong alkaline solutions the uptake rate from air is limited on the liquid side to a few times $10^{-5}$ mol/m$^2$ of liquid covered surface. For a stagnant liquid exposed to ambient flowing air such rates can be maintained for a only few tens of seconds before hydroxide depletion in the surface layer slows down the uptake. Similar $CO_2$ fluxes through air require boundary layer thicknesses less than about 1 cm. In order to minimize pressure drops, the flow paths should be kept as straight as possible. These considerations, discussed in more detail elsewhere, set the basic design choice for the wetted surfaces.

The simplest designs for wetted surfaces are parallel flat plates, e.g., as described in our aforesaid co-pending application Ser. No. 11/209,962. Such plates could have smooth surfaces that are wetted with liquid films. However, wetting smooth surfaces on vertical sheets requires elaborate liquid delivery systems, as most smooth surfaces that are corrosion resistant do not wet easily. Wetting non-vertical surfaces is somewhat easier, but one would lose half the effective working surface area as only one side of the sheet would be wetted. Losses would be even larger if the cover surface is submerged or partially submerged in the liquid solvent. Another option is to use textile materials. Textiles can support flowing films of liquid, but at the same time they allow flow of liquid through the matrix of the materials. However, textiles being flexible cause significant difficulties in maintaining accurate spacings among the surfaces, unless they are held in place by rigid structures with very small areas bridged by textiles only. Whether they are wetted from the top, or whether roller systems allow one to dip the textile material into a bath and then carry the sorbent along its path, maintaining a proper distance between the surfaces is difficult and experiments have shown that once two sheets touch the surface adhesion of two wet sheets is so large that they can't easily be separated. Moreover, once two wet sheets touch one another, the effective working surface area essentially is halved.

It is against this background that this invention offers better options for establishing contact between liquid sorbents and flowing air.

BRIEF DESCRIPTION OF THE INVENTION

The present invention employs as an air/liquid exchange open cell foams. Open-cell foams readily can retain fluids that fill the available foam space. Macroscopic surfaces of the foam block structure are then exposed to the air (or other gas) that is to be brought in contact with the fluid. (Macroscopic surfaces represent the gas-foam interface, these surface structures are large compared to the size of foam cells and define the boundaries of the foam block structure. They delineate the boundary between the inside and the outside of the foam, these surfaces can have complicated topological structures if gas flow channels are designed to cross through the foam.) Flows induced within the open cell structure allow for the continued transport of fluid through the foam's interior which leads to the replacement of spent fluid on the air-foam interface with fresh fluid. The exterior or interior macroscopic surfaces of the foam structure represent the approximate gas-liquid interface. The liquid sorbent fills the interior of the foam and the air bases by the foam/air interfaces or macroscopic surfaces. By pouring liquid on the foam it is possible to "overfill the foam and reach a level of saturation wherein fluid "oozes" out of the (macroscopic) surface layers and completely wets the surface. This represents one approach to liquid-gas contacting. An alternative that we consider preferred is to have maintained a liquid saturation level in the block wherein the liquid air interface is near the macroscopic surface but inside the cell structure.

Experiments suggests that at least for some foams it is advantageous to avoid fluid flow on the surfaces of the foam block, and to maintain a fluid filling of the foam block so that fluid resides near the surface. Experiments further show that the use of open cell foam as an air/liquid exchanger permits $CO_2$ uptake to be maintained for hours without liquid replenishment. While not wishing to be bound by theory, it is believed that sorbent flows internal to the foam structure transport spent fluid away from the surface of the foam structure into the interior and replenishes it with fluid drawn in from the interior of the foam block. It appears that mechanisms that can excite convection in open fluid, e.g., gravity driven convection due to thermally or chemically induced density gradient is sufficient to achieve such fluid transport inside the foam structure as well. In order to maintain fresh fluid supply near the foam surface without fluid flowing out of the surface, capillary action, osmotic pressures and gravity driven convection conspire together to create slow flow patterns that are confined to the inside of the foam block.

As the fluid in the foam structure becomes saturated with the absorbed gas, e.g., $CO_2$ fresh sorbent liquid can be introduced simply by pouring additional liquid onto the foam structure. Proper shaping of the structure, e.g., a trough like structure on the top, can greatly reduce fluid spillage. By shaping the bottom of the foam into a well defined low point it is possible to guide the exit flow to a single point.

BRIEF DESCRIPTION OF THE DRAWINGS

Further features and advantages of the present invention will be seen from the following detailed description, taken in connection with the accompanying drawings, wherein:

FIG. 2 is a top plan view of the air scrubber unit of FIG. 1;

FIG. 3 is a front, i.e., air inlet view of the air scrubbing unit of FIG. 1;

FIG. 4 is a side elevational view of the air scrubber unit of FIG. 1;

FIGS. 15(a)-15(c)-16(a)-16(b) and 17(a)-17(c) are perspective or side elevational views, as the case may be, of air scrubbing units made in accordance with yet other embodiments of the present invention.

DETAILED DESCRIPTION OF PREFERRED EMBODIMENTS

Figure 1:
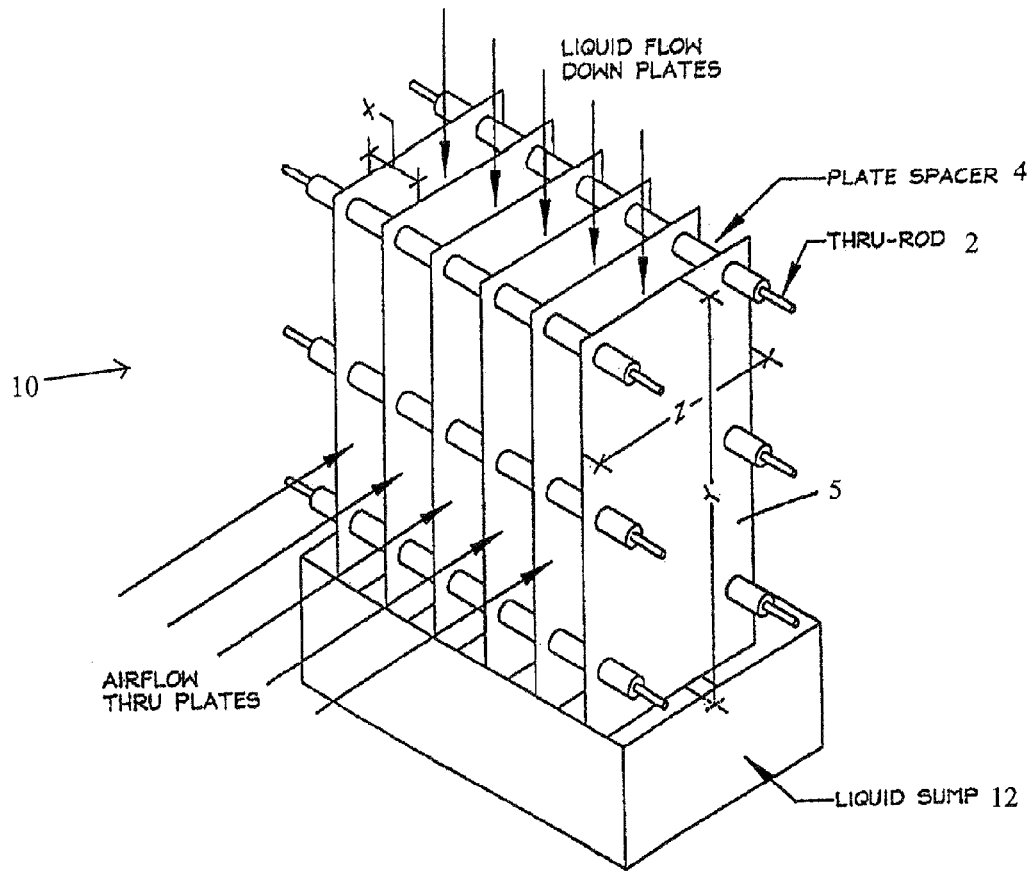
FIG. 1 is a perspective view of an air scrubber unit made in accordance with our aforesaid co-pending application Ser. No. 11/209,962.
Figure 5:
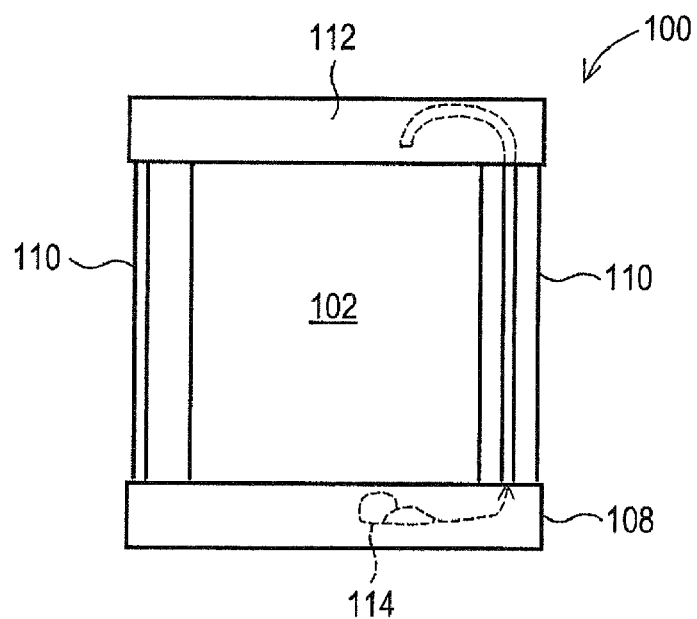
FIG. 5 is a side elevational view of an air scrubber unit made in accordance with one embodiment of the present invention.
Figure 6:
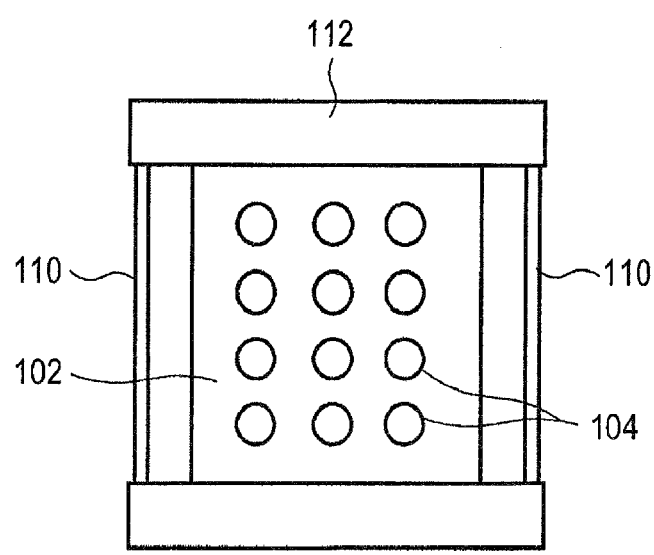
FIG. 6 is a front, i.e., air inlet end view of the air scrubber unit of FIG. 5.

The present invention is based on the use of an open cell rigid foam as the air/liquid exchanger. Employing open cell rigid foams as the air/liquid exchanges has an advantage in that they not only provide the air/liquid exchange surface, but also the cells become the support structure for the air/liquid interface. Accordingly, the framing or superstructures required for supporting the sheets such as in our aforesaid provisional application may be reduced or eliminated.

More particularly, and referring to FIGS. 5-8, an air scrubber unit in accordance with one aspect of the present invention consists of a wind collector 100 comprising a foam block 102 having a plurality of through channels 104 carved through the foam (or molded into the foam) to allow passage of air. Block 102 is mounted within a frame which includes a pan 108, uprights 110 and top 112. Pan 112 serves as a liquid sump for holding a sorbent such as concentrated sodium hydroxide solution. In a preferred embodiment of the invention, a liquid pump 114 pulls sorbent from pan 108 and delivers it to the top 112 where it may be sprayed or poured on top of foam block 102 using, for example, spray nozzles or the like.

Channels 104 preferably are cut straight through the foam block 102, since there is believed to be no advantage in causing the air to mix turbulently. Consequently, channels preferably are cut to run parallel to the direction of air flow. We note that this feature is particular to a flow with a low concentration gas one wishes to partially extract from the flow field. This is the case in extracting $CO_2$ from air. In situations where it is important to remove all of the impurity (e.g., $SO_2$ or $NO_x$) of where the rate of uptake is not limited on the fluid side, contorted channels may be of advantage.

The channels may comprise a variety of cross-sectional shapes. Round tube shaped channels generally are preferred, although other cross-sectional shaped channels including by way of example, but not limitation, square, triangle, diamond, and oval cross-sectional shaped channels may be used.

The foam blocks are formed of an open pore foam. The foam should have a high permeability for the sorbent fluid, and good capillary action to retain fluid. The foam also must be able to stand up to highly alkaline or corrosive liquid such as 0.5 molar solutions of sodium hydroxide (NaOH), or even stronger NaOH solutions. In some implementations it may be advantageous to use 5 molar solutions. A number of foam materials meeting the aforesaid criteria are described in the patent literature, see for example U.S. Pat. Nos. 4,566,221; 5,070,664; 5,414,957 and 5,454,189, and are available commercially. One particularly preferred foam material commercially available is AQUAFOAM® brand floral retention foam available from Syndicate Sales Corporation, Kokomo, Ind. AQUAFOAM®, which is believed to be a phenolic foam, has a very high permeability to fluid flow, and has sufficient capillarity to keep fluid inside at least for hydrostatic heads of at least 20 cm. Other foams may permit even higher hydrostatic heads. These foams also can stand up to 0.5 molar solutions of NaOH for at least 25 hours, and exhibit a minimal amount of swelling upon wetting, typically about 6%.

The basic collection device in accordance with the present invention consists of open cell foam that has been soaked with a liquid sorbent, such as sodium hydroxide solutions that strongly absorb carbon dioxide. The air flows through the apparatus through channels or passageways that are lined with foam and the air-liquid contact occurs at the sides of the channels as the air moves through the foam. The geometry of the collector could range from thin sheets of foam separated by air gaps, to a block of foam through which air passes through predefined passageways. As mentioned above and in our earlier aforesaid application Ser. No. 11/209,962, it is advantageous to shape these passageways in a manner that the air is allowed to follow an essentially straight path. With such geometry it is relatively easy to maintain laminar flow which minimizes the momentum loss (or pressure drop) in the fluid. The advantage of such a design is that the energy required to move the fluid through the contactor is minimal, and typically natural air flow is adequate. However, for other gas separation schemes a more aggressive mixing may prove advantageous in which case it is possible to design more complex or more convoluted pathways.

Rigid foams offer another advantage in that they not only provide a liquid/gas exchange surface, but by themselves also become the structure that provides the surface. Thus, the collector geometry surfaces are not limited to flat sheets on which liquid runs downward, but in principle one can consider all sorts of channels carved through blocks of foam that allow the passage of air through the foam. If the size of the channels is limited to a few boundary layer thicknesses (a few centimeters) there is no advantage in actively mixing the air. Consequently, optimal channel designs are straight in the direction of the air flow, but could be more intricate in the normal direction. One possible option is a set of tubular cross-section, e.g., hexagonally packed tubes that cut through the length of a block of foam. Other options are hexagonal cross-sections, or squares, either with horizontal and vertical sides, or sides tipped at a 45 degree angle (diamonds). Other options include horizontally or vertically elongated slots. A feature and advantage of the present invention is that collector geometric arrangement of these cross-sections may be optimized for fluid flow and fluid mixing.

Foams that could perform these tasks need to have high permeability for fluids. They also must exhibit sufficient capillarity to retain fluid, and they must stand up to highly alkaline and corrosive liquids used as sorbents. While specifically engineered foams may be created for this task, commercially available AQUAFOAM® brand floral retention foam provides a readily available relatively low cost foam that meets the aforesaid requirements.

FIGS. 11-15, demonstrate the use of AQUAFOAM® brand floral retention foam with 0.5 molar solutions of NaOH as the sorbent. A single tube (1 inch in diameter) cut through a nine inch long brick of floral retention foam will remove approximately 25% of the $CO_2$ present in air that moves through this brick at a typical speed of 30 cm per second. Uptake started as soon as the tube surface inside the brick was wetted. Unexpectedly, it proved unnecessary to continuously wet the surface of the brick. Once saturation had been achieved substantially constant $CO_2$ uptake was observed to be maintained for more than 16 hours. Given these dimensions, the flow rate of air is about 150 cc/second, this amounts at 400 ppm to 1.7e-4 moles of $CO_2$ per second, or about a 25% removal rate. This suggests that the system exceeds the $CO_2$ uptake rate of a smooth film of 0.5 molar NaOH solution, i.e., as in the case of the system of our aforesaid application Ser. No. 11/209,962. It also has been established however, that a block of florist's foam once saturated with sodium hydroxide solution can maintain $CO_2$ uptake characteristics along the surface of an interior tube which are comparable to or better than that of a continuously refreshed liquid film, and the uptake may be maintained for hours or days without additional fluid input.

It is thus seen that a foam block structure with straight tubular passageways cut therethrough or molded into the shape can be used with a sorbent to capture $CO_2$. Wetting of surfaces reduces to an occasional soaking of the foam. Soaking times may be hours or days apart.

Without intending to limit the scope of this invention, it is believed that there are two important ingredients in the properties of the foam. One, the capillary forces are such that the foam readily soaks up fluid. In this way it is easy to keep the fluid inside a block of foam. Capillary pressure drops, however, limit the maximum height a block can have so that the hydrostatic pressure does not get strong enough to pull in gas at the top of the cylinder and bring in additional gas.

A second important feature is that a completely filled region of the foam can easily support fluid flow. Such fluid flow may be induced by gravity feed, by density fluctuations in the fluid due to temperature changes, or density changes due to chemical changes, e.g., evaporation. In any event, it is important that fluid motion inside the foam near the interface between the gas in the passageway and the liquid in the foam is maintained. Without such motion the fluid near the surface would rapidly saturate with sorbate and the process would stop. In the case of $CO_2$ absorbed into an NaOH brine the characteristic time for saturation is tens of seconds. Nevertheless experiments have shown that the process is maintained at full strength for hours and days. This strongly suggests that fluid motion or osmotic changes in the foam replaces spent fluid with fresh fluid on a continuous basis.

The basic concept is that of a foam block with passageways through it which is filled with liquid and that is exposed to a continuous gas flow through the passageways. The passageways are scaled so that all the air in the passageway is in contact with the sorbent surface and thus relinquishes part or all of the $CO_2$.

A feature and advantage of the present invention is that it is not necessary to continuously expose the foam block to fresh liquid. Indeed too fast a fluid flow entering the foam seems to lower the uptake capacity of the material. It is believed that the reason for this change is that a fluid film on the outside of the foam has less surface than a fluid film that has retreated into the pore space of the open cell foam. The roughened interface between air and liquid in the first few cells inside the foam matrix exceeds the surface presented by a smooth liquid film which would form on the exterior of the foam if liquid is replenished to rapidly. The effective improvement due to such a design remains to be fully characterized but it contributes significantly to the uptake capacity of the fluid.

One feature of a foam block is that fluid will flow through it evenly if excess fluid is presented at the top of the block, excess fluid will drain from the block at a low point. It is thus possible to shape the block so that all the fluid will enter the block at a predefined top surface and leave possibly in a small patch at the bottom which is put in contact with a drainage pipe.

It is possible to either close the foam on its outside or coat it with a coating that cannot be penetrated by the liquid in order to prevent the fluid from leaving the block. One advantage of such an approach would be that in a continuous feed system one could greatly exceed a block height which would be stable for the foam alone.

Figure 7:
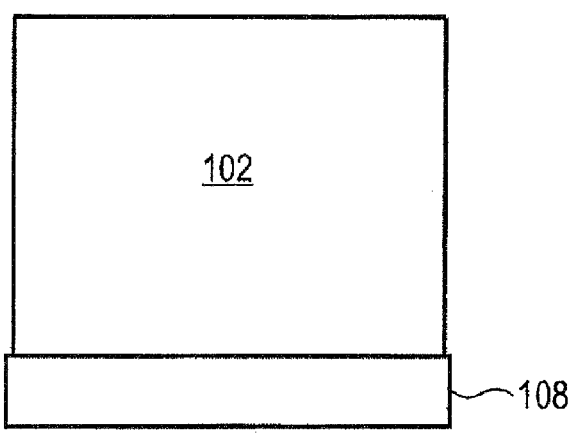
FIG. 7 is a view, similar to FIG. 5 of an alternative form of air scrubber unit made in accordance with another embodiment of the present invention.
Figure 8:
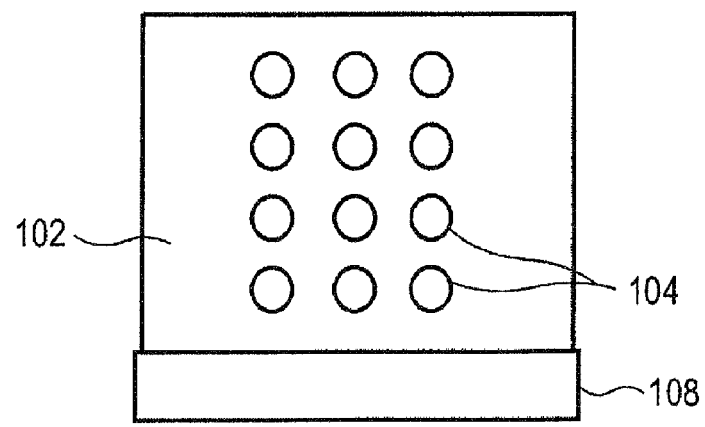
FIG. 8 is a view similar to FIG. 6 of the air scrubber of FIG. 5.
Figure 9:
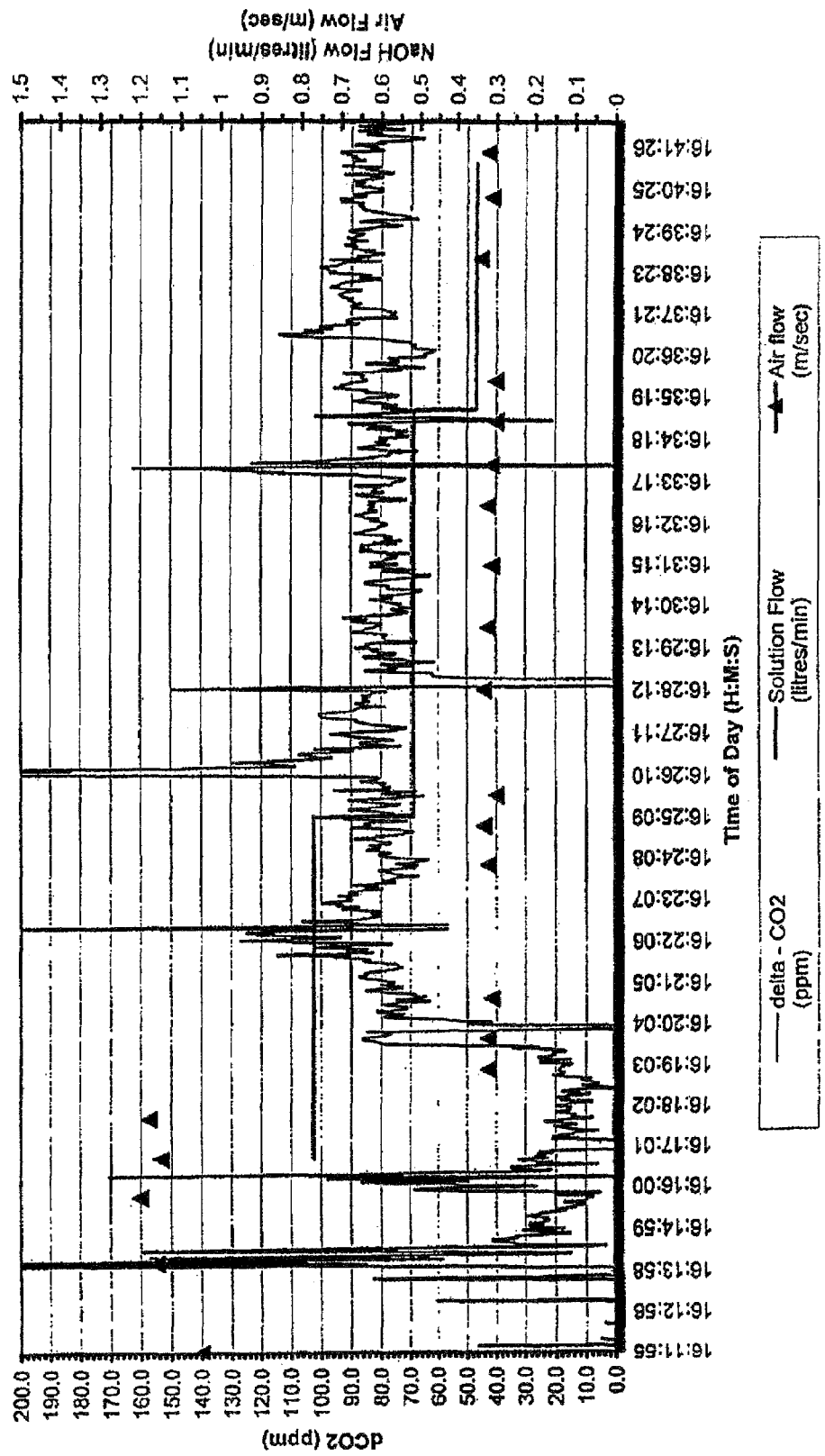
FIGS. 9-13 are graphs of a series of experiments run using open cell rigid foam as the air/liquid sorbent exchanges in accordance with one embodiment of the present invention.
Figure 10:
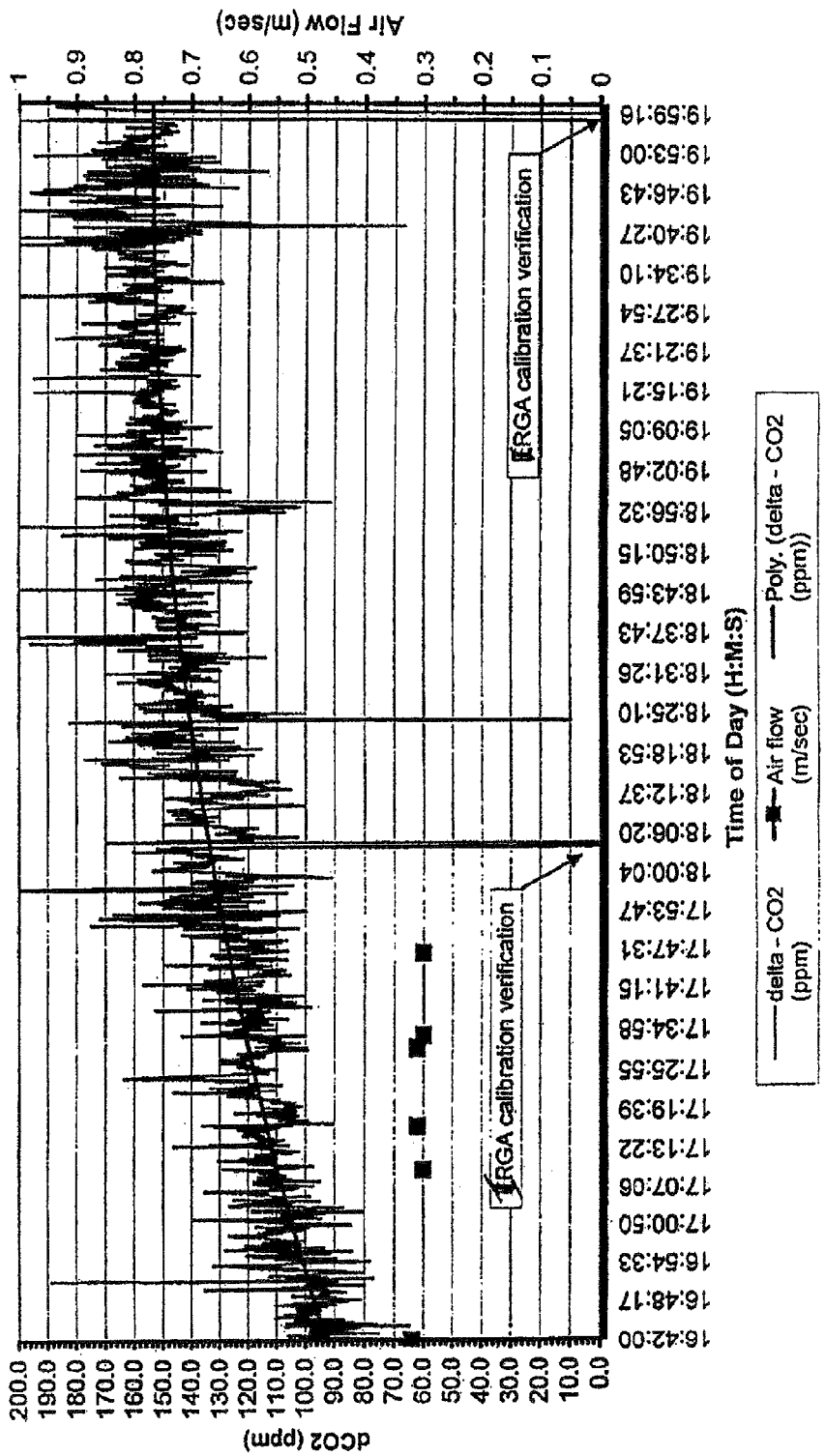
Figure 11:
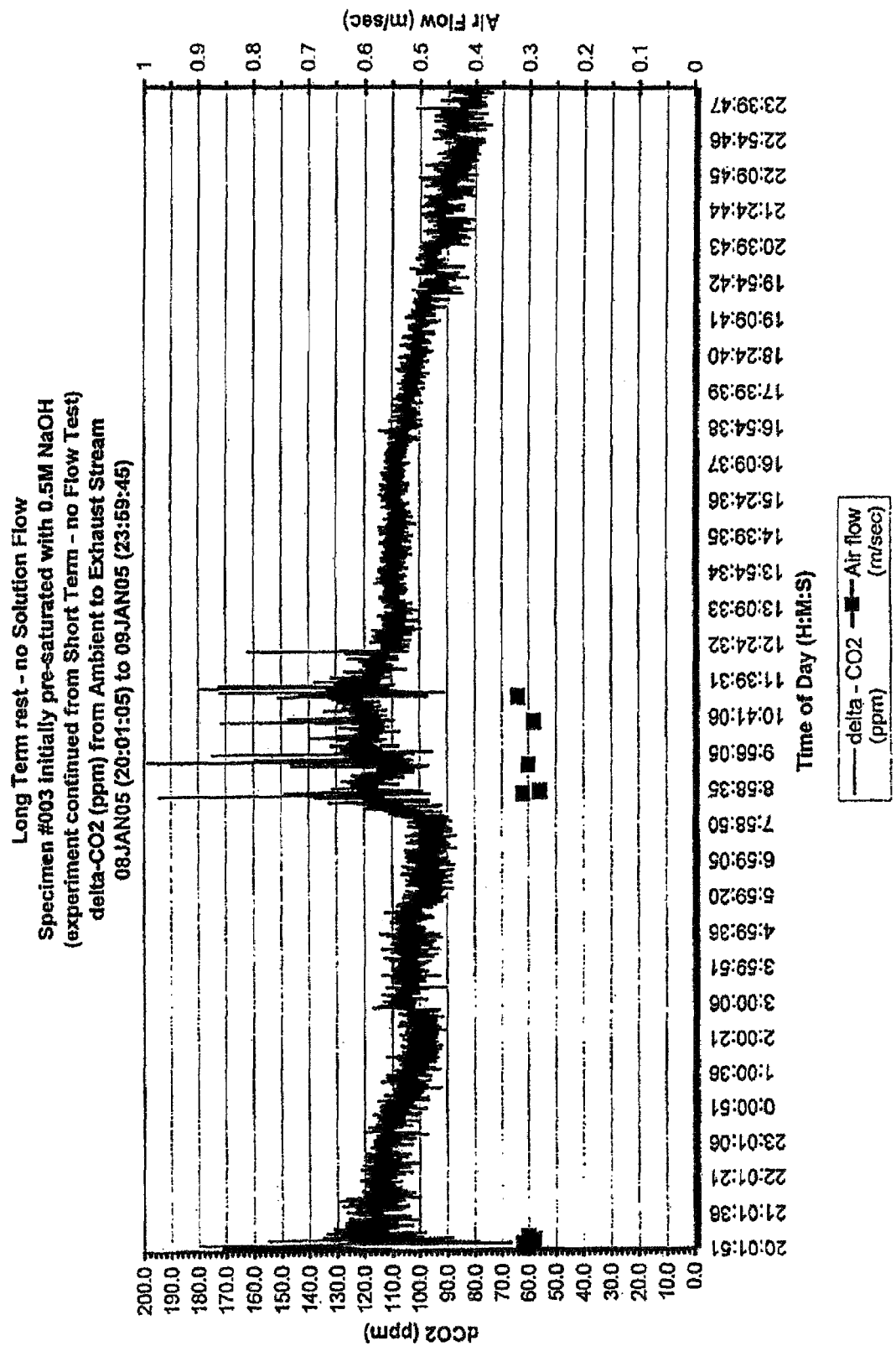
Figure 12:
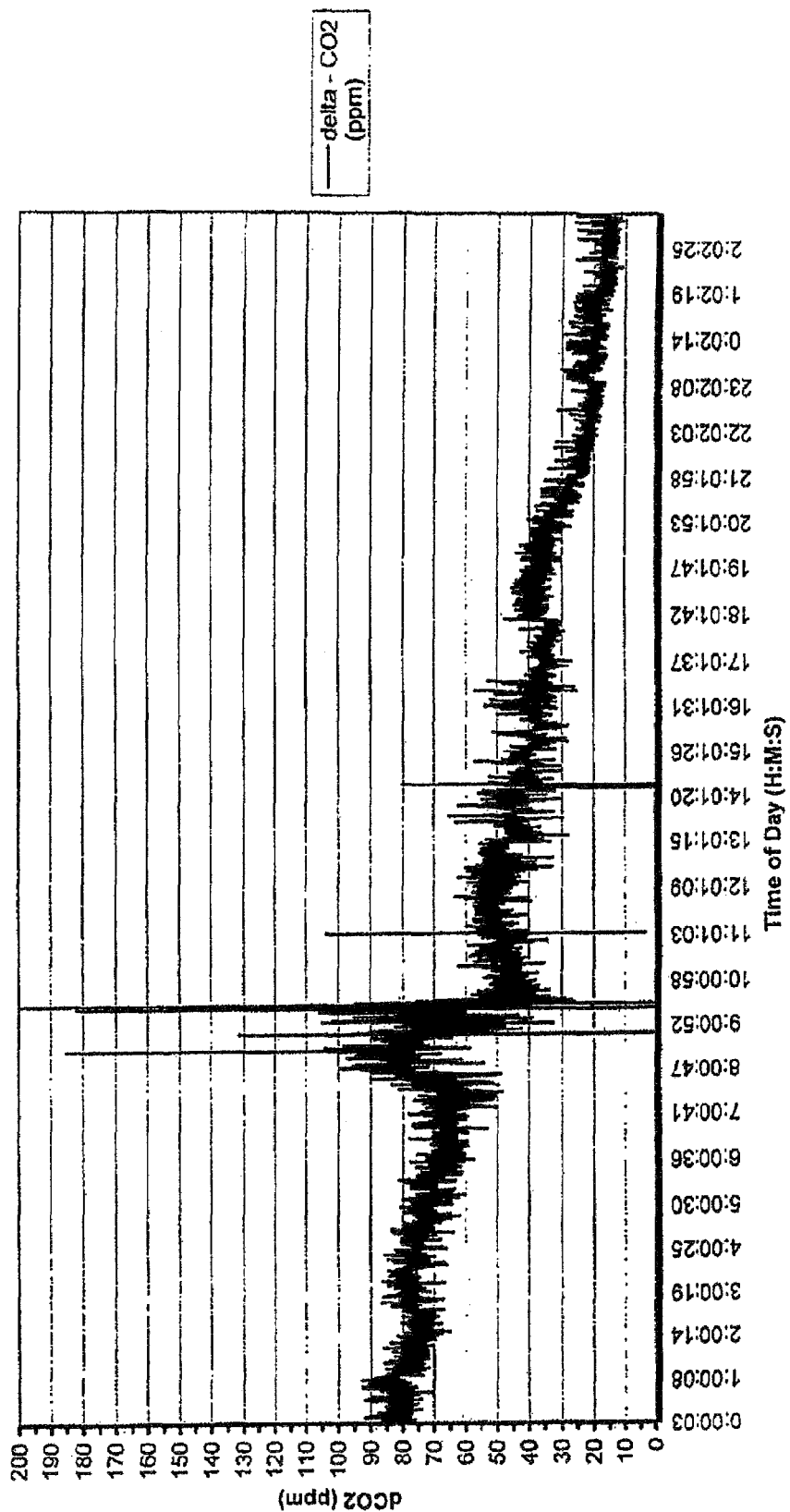
Figure 13:
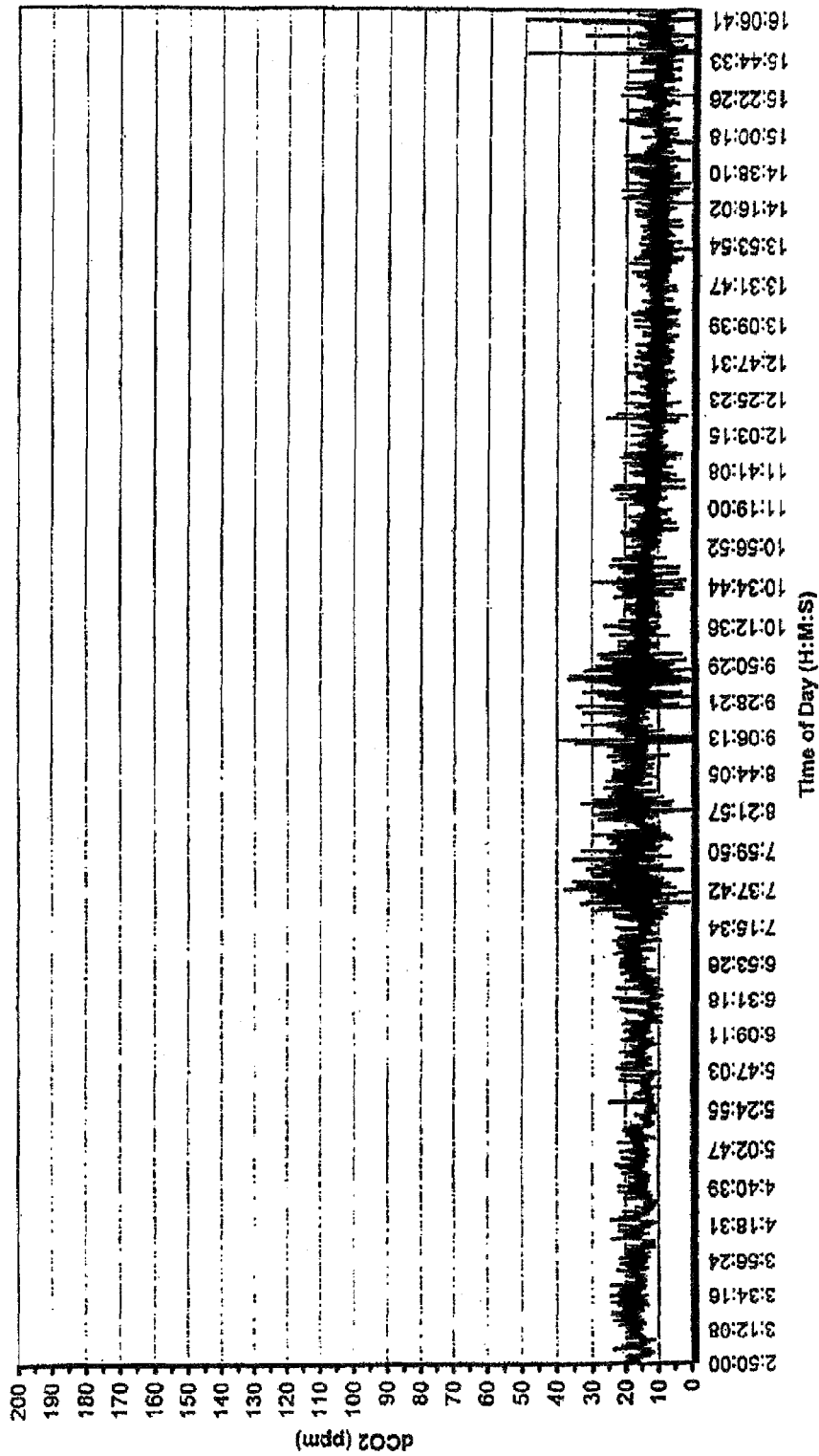

Liquid could be added continuously or in pulses. Based on current experiments, pulses could be far apart in time. It also appears possible to completely saturate the block with the sorbate and remove the entire block in the air capture structure, and eliminate entirely periodic rewetting the block. In such a design it could be advantageous to recover the fluid by crushing the block and filtering the foam block debris from the fluid. Foam residue, depending on its composition may be recycled or used as fuel in the general operation of an air capture plant. This is illustrated in FIGS. 7 and 8.

While the invention has been described in connection with the extraction of $CO_2$ from air, the invention is not so limited. For example, the invention also advantageously may be used to remove $CO_2$ from flue gas by directing flue gas or a portion thereof through a wetted foam block in accordance with the present invention. Also, the invention advantageously may be incorporated into an HVAC system to remove, for example, DOC, $CO_2$, CO, NOx and SOx from gases in buildings by use of suitable sorbents.

In yet another embodiment to the invention, rather than a straight through air passageways, complex pathways could be created to encourage turbulence in mixing and thus assure more complete removal of undesirable components in a gas stream. Also, if desired, air may be passed through a plurality of foam scrubbers, stacked or in sequence, each having its own sorbent for removing various trace gases from the air.

In yet another aspect, the invention provides an approach to absorbing carbon dioxide from an air stream that can proceed efficiently even with weak sorbents and at low reaction rates. By wetting a foam, which has channels cut through it, in a manner that internal foam surfaces near these channels are fully or partially covered with a weak sorbent, it is possible to amplify the effective sorbent surface area that is exposed to a gas flow relative to the surface area of a plain liquid film. This results in an uptake rate for a dilute trace gas on the nominal surface of the foam that for weak sorbents is substantially higher than that on a plain liquid surface. For the extraction of low concentration gases which are intrinsically gas-side limited, this technique obviates the need for strong sorbents with a fast rate of reaction. As a consequence, one can take advantage of weak sorbents like sodium carbonate for capturing $CO_2$ from air, rather than strong sorbents like sodium hydroxide. This greatly simplifies subsequent sorbent recovery steps. The following describes the principles involved and outlines a method and apparatus to create moist foam surfaces and to extract the $CO_2$ laden sorbent from the foam. These methods can be used with any applicable sorbent recovery method. They are not limited to the capture of carbon dioxide from the air, but could be extended easily to the capture of trace gas admixtures from any gas stream. As outlined below, the details of the implementation will depend on the concentration of the trace gas, the rate of adsorption or absorption reaction and the flow speeds involved. It also matters whether the goal of the process is to capture all of the trace gas out of the mixture in order to clean up the gas, or whether the goal is to collect a valuable stream of trace gas from the mixture without attempting to eliminate nearly all traces from the carrier gas.

Taking as an example, a block of polyurethane open-cell foam moistened with a sodium carbonate solution and with air channels through it will absorb $CO_2$ from the air blowing through the channel. For example, for straight tubular channels with diameters of 1 to 3 cm, the uptake rate for $CO_2$ per unit of tube surface far exceeds that of liquid solutions of sodium carbonate of equivalent strength. While not wishing to be bound by theory, it is believed that the amplification is due to the large finely structured interior foam surfaces that greatly increase the effective surface relative to the nominal surface which is measured by the geometric dimensions of the channel and which by definition disregards the fine structure of the foam. With r the radius of the cylindrical channel and L its length, the nominal surface area is defined as $$A = 2\pi r L$$

The surface area of liquid coating the foam surfaces or that of small droplets caught in the foam is of course much larger. The actual exposed surface area depends on how fine the foam is, what fraction of it is wetted, the geometrical structure of these surfaces and the thickness of the foam-layer around the whole that is accessible to $CO_2$ from the air. Not all of the foam volume is equally accessible to $CO_2$ contained in the air blowing through the channel, as many of the internal foam surfaces may be too far away from the channel to be reached by gaseous diffusion. Gas diffusion is, however, about four orders of magnitude faster than diffusion in liquids. Thus we can achieve a substantial penetration of $CO_2$ into the foam material.

It also appears based or experiments preformed on these foams that pressure gradients inside the foam materials cause convective flow throughout much larger foam volumes than would be accessible simply by diffusion. As a result the active foam volume is quite large limiting the minimum spacing between macroscopic channels crossing the foam matrix. Conversely, the size of the active flow volume that can be achieved is very large.

Here and in the following discussions we will consider polyurethane foams and sodium bicarbonate as a sorbent of carbon dioxide which is to be extracted from ambient air. However, the concepts laid out here are not limited to these choices of solvents, sorbents and sorbates, but can be applied more generally. The approach is particularly useful for the partial extraction of a gas component that is very dilute in a carrier gas, but where complete recovery is not of primary concern.

In our co-pending application Ser. No. 11/209,962, we outlined a strategy for contacting air with sorbent coated surfaces. We showed, that with the slow reaction kinetics typical of hydroxide or carbonate solutions absorbing $CO_2$, one should provide straight channels for laminar flow to maximize the uptake of $CO_2$ for a given energy investment in pressure drop across the collecting structure. If the liquid side reaction kinetics could be improved, more complex channels would reduce the air side limitation, but for low reaction kinetics straight channels with smooth surfaces appear most effective. We therefore envision surfaces made by forming channels through foam along which the air can move over pieces of foam or through more or less straight channels that cross through the foam. In the case described in earlier our U.S. Provisional Application Ser. No. 60/649,341, the air flow establishes a boundary layer along the surface of the foam through which $CO_2$ can diffuse from the bulk gas to the foam surface. From there $CO_2$ can migrate further until it reaches a gas-liquid boundary where it will be absorbed into the liquid. For channels with a characteristic width on the order of a centimeter, the diffusion constant in air would limit the flux to the channel wall to the order of $10^{-4}$ mol m$^{-2}$ s$^{-1}$.

In the flow darnel designs discussed here, and for a strong alkaline sorbent like 1 molar NaOH, the liquid side limitations for $CO_2$ uptake turn out to be similar to the gas side limitations. Thus, it is in general not possible to exceed these uptake rates for airstreams over liquid surfaces of NaOH. By reducing the air side limitation, for example by thinning the boundary layer, which could be accomplished either by narrowing the channel width, or by introducing turbulence which reduces the thickness of the boundary layer, one encounters the liquid side limitations to uptake. On the other hand reducing the liquid side limitations for example by increasing the effective surface area does not much change the uptake rate unless one also reduces air side limitations.

For a weak alkaline sorbent like sodium carbonate, the situation is quite different in that the liquid side limitations severely limit the uptake rate over a liquid surface. Air side limitations in this case are negligible. As a result measured uptake rates are on the order of $10^{-6}$ mol m$^{-2}$ s$^{-1}$.

For a weak sorbent, like a sodium carbonate solution for which the uptake rate is limited on the liquid side, effectively increasing the liquid surface area has a very positive effect on the overall performance. Our experiments with carbonate-wetted foam resulted in $CO_2$ uptake rates of about $2\times10^{-4}$ mol m$^{-2}$ s$^{-1}$. Uptake rates with NaOH were slightly higher than that, but they failed to show a similar improvement compared to the uptake rates over plain liquid surfaces. Without wishing to be bound by theory, we surmise that the difference between flat surfaces and foam surfaces arises from the fact that the uptake of NaOH is virtually complete in a thin layer near the tube surface and that the wetted foam surfaces deeper in the foam are unable to contribute to the uptake, as uptake is already complete. However, even if by creating a high degree of turbulence in the air one would create a thinner air side boundary and thus increase the $CO_2$ flux into the foam, the multiplier would not be as large as for the carbonate, as the air side limitation would still hold, but this time by adding gas diffusion distance inside the foam. By creating fast gas flows inside the foam, one would overcome this limitation, but only at the price of extreme energy consumption. For foams to obtain similar enhancement factors with sodium hydroxide solutions would require a large ratio of internal surface to nominal surface within a short distance from the nominal surface. This is difficult as smaller pore sizes tend to fill up with liquid and thus would not increase the available surface area.

In summary, the explanation for the observed effect is likely to be the following: The wetted foam provides a certain amount of wetted area per unit volume of foam. If we assume that the typical pore size is given by d, and occupies a volume of $d^3$ than the typical area available per pore would be $\alpha d^2$ where a is a geometric factor that one might assume is generally on the order of 1. The wetted surface area available per unit volume of foam is thus given by the ratio $\gamma=\alpha/d$. Hence the finer the pore size the larger the available surface area, at least as long as the geometric factor a can be held constant. Note, however, that if the pores fill up completely which is likely to happen for small pores in the foam, $\alpha$ tends to zero. The depth to which the available pores can interact with the $CO_2$ stream that contacts the external surface of the foam depends on the rate of uptake. In short, assuming the air in the pores is standing still, the flux of $CO_2$ inward is limited by the rate of diffusion and in order to maintain a flux of $10^{-4}$ mol m$^{-2}$ s$^{-1}$, the thickness is limited by $$F = \int CO_2 \frac{D}{\lambda}$$

Here F is the carbon dioxide flux through the surface with $F=2\times10^{-4}$ mol m$^{-2}$ s$^{-1}$, $\rho_{CO2}=0.015$ mol m$^{-3}$ the ambient density of $CO_2$, $D=1.4\times10^{-5}$ m$^2$ s$^{-1}$ is the diffusion constant of $CO_2$ in air, and $\lambda$ is the thickness of the absorbing foam layer. Without wishing to be bound by theory, we estimate that the active foam layer in that case has a thickness $\lambda=1$ mm. Experiments suggest that the effective thickness is substantially larger than that, suggesting that the transport mechanism into the foam does not entirely rely on molecular diffusion.

It is likely that surface roughness on the boundary between the channel and the foam creates small pressure fluctuations which in turn promote flow of gas into and out of the foam at rates in excess of molecular diffusion rates. Assuming this to be the case, then the surface roughness of the foam is an important design parameter. Experiments have shown that pressure fluctuations can lead to the utilization of several centimeters around a half inch channel.

Our experiments have shown that it is possible to obtain a significant enhancement in $CO_2$ uptake rate for weak sorbents by soaking polyurethane foams in one or half molar sodium carbonate solutions and let the carbonate act as a $CO_2$ sorbent. Uptake rates were optimized by assuring that the body of the foam is exposed to the liquid by immersing the foam piece into the liquid and either letting the liquid drain or driving liquid out of the elastic foam by compressing it gently.

In contrast to experiments performed with AQUAFOAM® as described above, which is a very hydrophilic phenolic foam that easily retains liquid and thus has pores completely filled with liquid, the polyurethane foams were essentially stripped of 80 to 90% of the volume of liquid it contained at the point of immersion. In contrast to the experiments on phenolic foams (AQUAFOAM®), in experiments with polyurethane foam the duration of uptake was greatly reduced from days or weeks to tens of minutes. In return the rate of uptake was greatly enhanced for a weak sorbent like a half molar sodium carbonate solution. The critical difference between the two experiments is that in the former experiments the foam is filled with fluid, whereas in the latter the foam volume is in its majority filled with gas. Intermittent soaking of the polyurethane foam block during the experiment, which would fill the pore space with liquid, lead to an immediate reduction in $CO_2$ uptake which only recovered after the liquid level contained in the foam had been appropriately reduced.

While the $CO_2$ uptake of a carbonate solution is greatly enhanced, the rate of water evaporation is essentially unchanged. Water evaporation again will happen only from the surface of the channel wall, pore spaces inside the system are effectively saturated in water vapor and thus do not contribute to evaporation. Thus relative to systems that are utilizing plain liquid surfaces, the water loss rate relative to the $CO_2$ uptake rate is greatly reduced.

The role of hydrophilic vs. hydrophobic vs. mixed surfaces is at this point not fully understood. Each have advantages and disadvantages. Hydrophobicity controls the amount of liquid retained in the foam and the ease with which this liquid can be applied evenly. Thus, it is believed that a hydrophilic phenolic foam with slightly larger than usual pore sizes could combine excellent wetting properties with an appropriate low water retention level. Most commercially available phenolic foams are designed to retain water, and thus are not well suited to this application.

Some of the foams we have investigated are hard foams that would crush and be mechanically destroyed if subjected to significant compression. Other foams are very elastic and therefore can be "squeezed." Hard foams can only be flushed with fluid. In order to maintain an appropriate level of saturation, it is necessary to let such foams drain. On the other hand, it is possible to push liquid out of the foam by driving a gas like air under pressure into the foam matrix.

Unevenness in flow patterns, draining and drying rates can render the use of these foams very challenging. In the case of soft, elastic foams it is possible to move liquid into and out of the foam by compressing the foam matrix. In the case of hard foams turning the foams will help in evenly distributing fluid throughout the volume of the foam.

Thus, another aspect of this invention is concerned with the application and extraction of liquid from soft and elastic foam structures as well as from foams that cannot be compressed without damaging the foam structure.

Figure 14A:
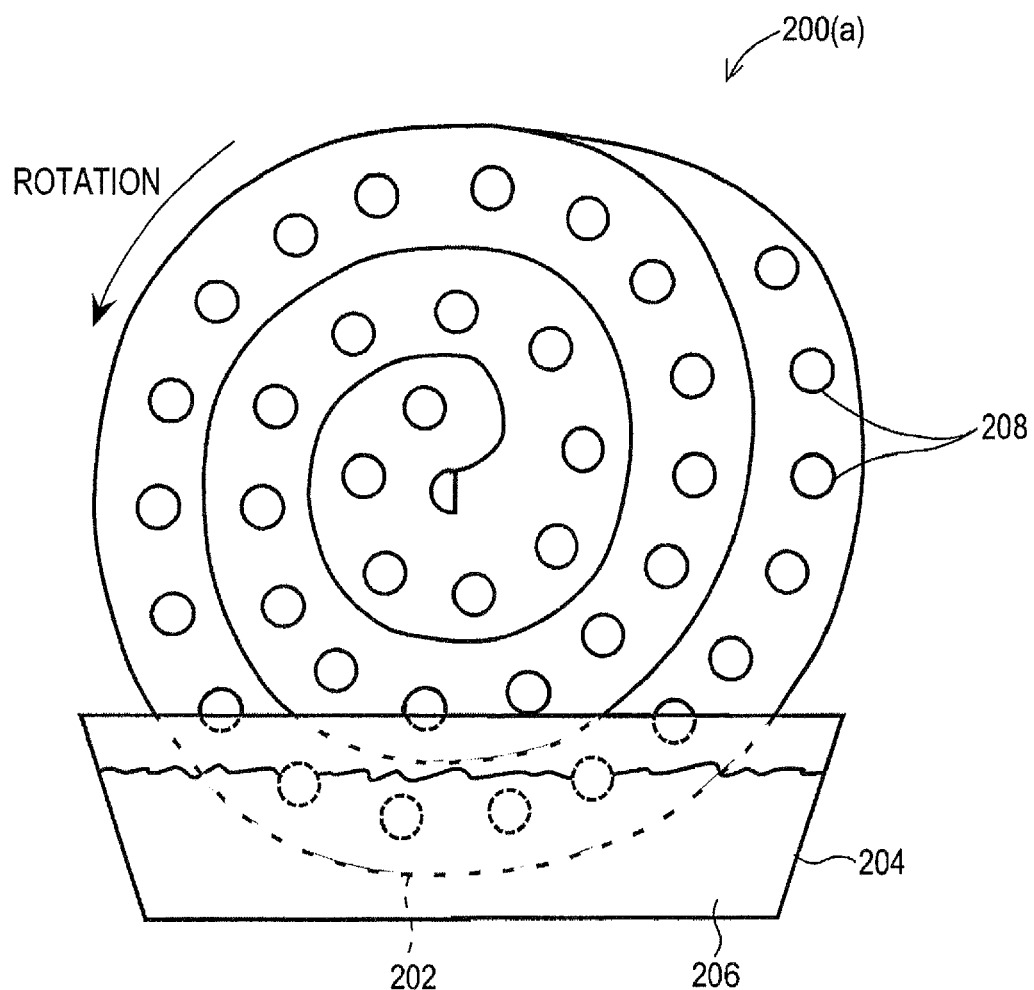
FIG. 14a is a side elevational view, in partial cross-section
Figure 14B:
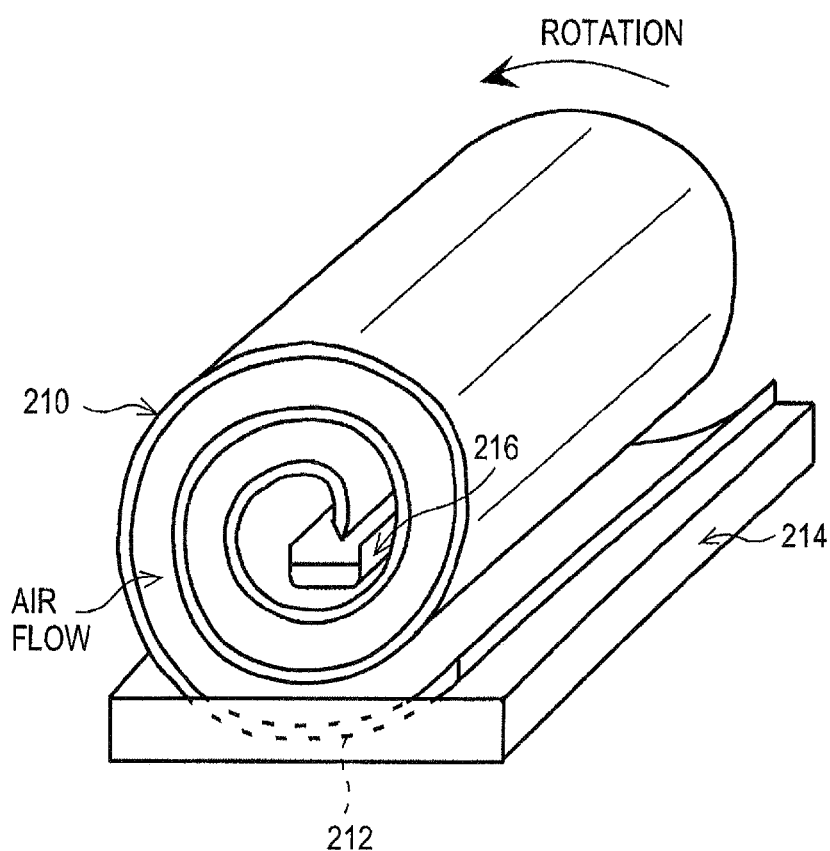
FIG. 14(b) is a perspective view of yet alternative forms of air scrubbers made in accordance with another embodiment of the present invention.

The most simple approach to wetting the foam would be application of liquid on the top and letting it drain by gravity. Particularly large celled foams, or reticulated foams which drain easily are suitable for this approach. If wetting a foam is accomplished through flowing fluids and gravity based drainage, then slowly rotating the foam aids in obtaining even fluid coverage inside the foam. The direction of the axis of rotation must have a component in the horizontal direction, so that rotation does change the flow direction inside the foam as it changes the alignment of the foam with the direction of gravity. Rotation speeds are matched to the foam and fluid flow properties such that the bulk of the fluid but not all in the time of a rotation can flow to the bottom of the foam volume. By shaping the foam appropriately it is even possible to transfer fluid in the process of rotating the foam piece. As an example, the foam may be formed into a closed spiral shape 200 as depicted in FIG. 14(*a*), and slowly rotated about its axis with its rim or periphery 202 dipping into a pan or sump 204 containing liquid sorbent fluid 206. As before, channels 208 may be formed through the foam to allow passage of air. Alternatively, the foam may be formed into an open spiral shape 210 as depicted in FIG. 14(*b*) and slowly rotated with its periphery into a pan or sump 214 containing liquid sorbent fluid. Also, if desired, the central axis end of the foam spiral may be mounted in a sorbent collection tray 216 which rotates with the foam spiral. The rotation in this case will gradually move the fluid from the rim of the shape to its center where it may be extracted from the foam.

Figure 15A:
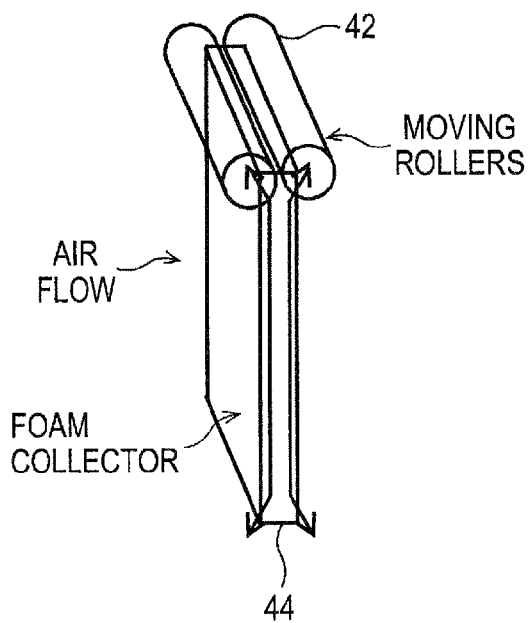
Figure 15B:
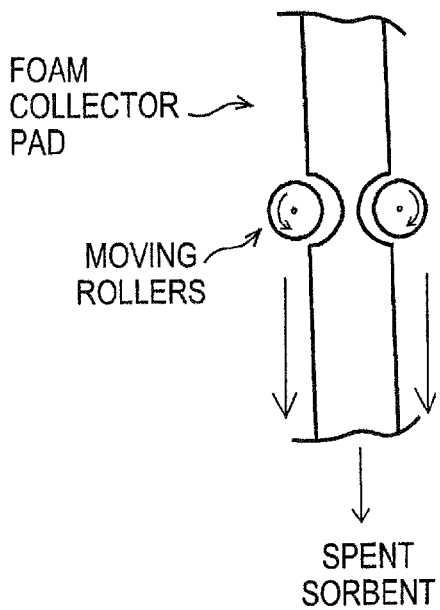
Figure 15C:
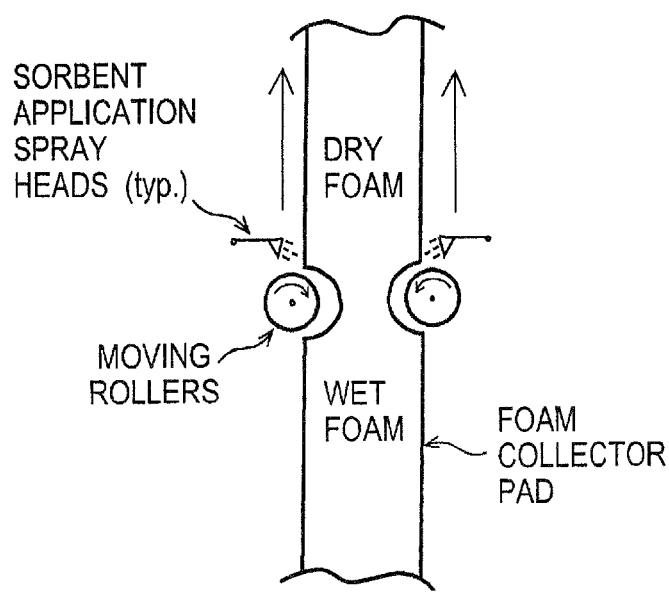

In foams that can be elastically compressed, it is possible to assure fluid mixing by moving the fluid by compressing and relaxing the foam. Referring to FIGS. 15(*a*)-15(*c*), in order to move liquid through the foam structure external pressure may be applied by moving rollers 42 over the surface of the foam 44 or by compressing foam blocks between flat plates. The rollers 42 may be smooth cylindrical surfaces that roll on both sides of the foam. The rollers push the external foam surfaces toward each other and thus force fluid to flow and mix throughout the volume. Alternatively, one can use a single roller on one side, and a rigid surface on the back of the foam holding the foam in place. This arrangement would be particularly useful for relatively thin foams, where the additional cost of a second roller and the concomitant structural complications would not be justified.

Figure 16A:
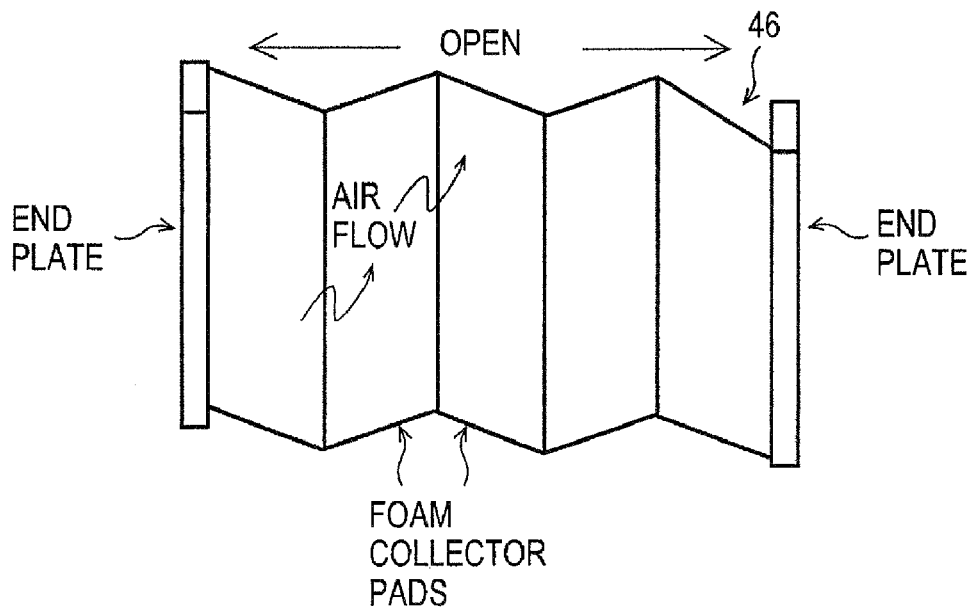
Figure 16B:
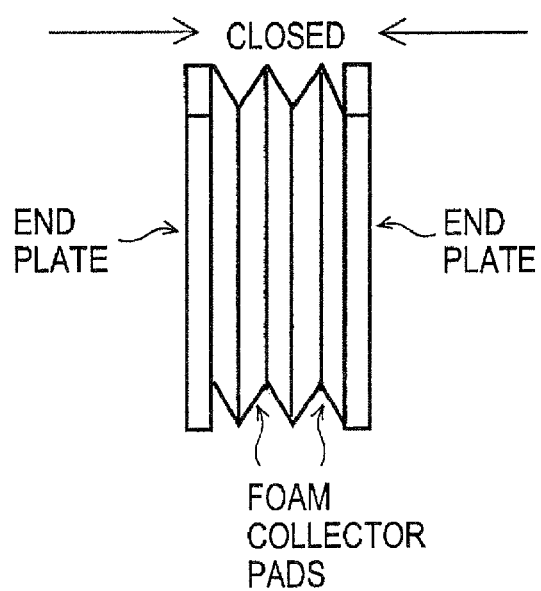

Instead of having smooth surfaces the surfaces of the rollers can be structured and shaped so as to increase the fluid movement in the foam by varying the degree of compression locally. Referring to FIGS. 16(*a*)-16(*b*), options include, simple fluting 46 with ridges that follow the roller axis. Alternatively one can consider ridges that run circumferential around the rollers, or surfaces with dimples and protrusions. With any of these structured surfaces, it would be useful to match the surfaces on the opposing rollers (or shapes in the structured walls) so as to optimize fluid flow patterns. Attention must be paid to maximizing volume change in the foam while minimizing shear strain in the foam.

A particular implementation which we discuss here for illustrative purposes would be a foam matrix rectangular in shape, with large width and height and a relatively small thickness, as an example consider a foam block, 2 meters high, 1 meter wide, and 0.3 m in thickness. Narrow tubular channels cross through the block in the 0.3 m thickness of the block. Air would flow through the foam in the direction of the channels, traversing the foam in the direction of its smallest dimension. Liquid could be applied to its two sides or to the top, and rollers would span the rectangular faces 2 m tall and 1 meter wide. The rolling action would squeeze liquid in place, a downward stroke with a high degree of compression could be used to squeeze liquid downward and let it drain from the bottom of the block.

Rollers would move up and down the sides of the foam, and they might move in or out to modify the compression on the foam. An upward stroke with less compression could be used to establish a uniform fluid filling throughout the brick.

Liquid could be applied on the top of the brick and pushed down by the rollers. Some fluid will be pushed downward, and depending on the gap between the rollers a certain amount of fluid is left behind in the foam matrix. If the height of the foam is not too large, all fluid could be applied on the top and pushed down to the bottom. Alternatively, we can spray the fluid onto the sides of the foam in advance of the rollers. If the compression is set high, the rollers can be used to squeeze out liquid that is either captured directly in front of the rollers as it pushes out of the sides of the rollers or if the speed of the rollers is sufficiently slow, the fluid will be pushed to the bottom of the foam pad, where it will be extruded and collected. It is thus possible to remove liquid from the pad by either injection additional carrier fluid, or just squeezing out liquid from the foam. In a second application fresh fluid is applied to the foam, which with a lower level of compression is evenly applied over the volume of the foam pad.

An alternative to rollers, shown in FIGS. 17(*a*)-17(*c*), would be opposed flat plates 48 squeezing the entire area of the foam 50. This would work particularly well for arrangements in which the airflow is aligned in the vertical direction and the compression of the foam is used to squeeze fluid in and out of the foam parallel to the air flow direction, which usually represents the smallest dimension of the foam pad. It is also possible to turn the foam pad prior to squeezing and move it from an upright position into a horizontal position.

Finally it also is possible, to move the pads through the rollers and install the rollers in a fixed position.

A particular implementation where the foam is moving rather than the rollers would be design where the foam moves as a continuous loop, like a belt over rollers that saturate and squeeze the foam, while the foam moves in an endless loop. These loops could be arranged in various ways, in particular it is possible to run the loop vertically up and down, or run it horizontally.

Thus, a dilute gas can be collected from a gas stream by absorbing the compound of interest in a liquid that is injected into the foam. The amount of liquid present is chosen such that gas flow through the foam sees little impediment, the bulk of the pore volume is filled with gas, and gas filled pore spaces are interconnected so as to make it possible to transfer $CO_2$ by diffusion or other means from one pore to the next, until it gets absorbed.

For air side limited flows, channels are ideally straight, but the effective rate of migration of sorbate gas into the foam structure may be enhanced by creating pressure fluctuations in the flow field.

It is thus seeing the present invention provides a novel and low cost system for scrubbing gases from air. A feature and advantage of the present invention is the significant reduction in the cost of the system due to the use of low cost foam for the air/sorbent exchanger. The foam is significantly low in cost that it may be employed and then discarded. For example, the foam may be removed, and crushed to recover the sorbent, and the foam discarded or burned for its energy content.

The invention claimed is:

1. A method for enhancing contact between a trace gas in a gas stream and a fluid sorbent solution which comprises creating fluid sorbent covered surfaces in an open and/or reticulated cell foam and flowing the gas stream along through-channels past the foam, wherein the cell foam is filled predominantly with gas and wherein at least some of the gas volumes inside the cell foam are interconnected with each other and are connected to the gas flow in the through-channels passing through the foam, and wherein the flow of the gas stream is varied over time, thereby enhancing the transport of sorbate gas into the foam structure.

2. The method as claimed in claim 1, wherein the sorbent comprises a liquid that is held in pores of the foam, either as a coating for the foam or as liquid droplets held within the foam structure.

3. The method as claimed in claim 1, wherein the fluid sorbent solution also includes a suspension of solid sorbent particles, and including the step of introducing said fluid sorbent solution and suspension of said sorbent particles, into the foam, and draining or evaporating said fluid at least in part whereby to leave solid particles in said foam.

4. The method as claimed in claim 1, wherein the gas stream is flowed through flow channels formed in the foam.

5. The method as claimed in claim 4, wherein the flow channels are cylindrical.

6. The method as claimed in claim 4, wherein the flow channels have complex shaped walls creating complex flows for reducing the thickness of a boundary layer between said flow and walls of said flow channels.

7. The method as claimed in claim 1, wherein the foam comprises a hydrophobic material.

8. The method as claimed in claim 1, wherein the foam comprises a hydrophilic material.

9. The method as claimed in claim 1, wherein the foam is comprised of both hydrophilic and hydrophobic components.

10. The method as claimed in claim 1, wherein a plurality of solid sorbent particles are adhered to the foam structure.

11. The method as claimed in claim 1, wherein a plurality of solid sorbent particles are immobilized in the foam matrix.

12. The method as claimed in claim 1, wherein the sorbent comprises a combination of hydrophilic and hydrophobic particles.

13. The method as claimed in claim 12, wherein the particles are washed into the foam as a suspension.

14. The method as described in claim 12, wherein the particles are captured in-situ in the foaming process.

15. The method as claimed in claim 12, wherein the foam has a pore size of between 0.1 mm and 1 mm.

16. The method as claimed in claim 12, wherein the foam is dipped in a sorbent liquid, including the step of rotating the foam in contact with the sorbent liquid in a reservoir whereby to wet the foam, whereupon excess fluid is drained from the foam structure by gravity.

17. The method as claimed in claim 16, wherein the foam includes channels which run generally parallel to the axis of rotation.

18. The method as claimed in claim 16, including the step of adding fresh sorbent liquid to the reservoir.

19. The method as claimed in claim 1, wherein the foam comprises a resiliently deformable foam, and including the step of expressing sorbent liquid from the foam matrix by compressing the foam.

20. The method as claimed in claim 19, wherein the foam is compressed between one or more rollers or plates, or a combination of rollers and plates.

21. The method as claimed in claim 20, wherein the rollers have structured surfaces.

22. The method as claimed in claim 21, wherein the rollers have ridges running parallel to the roller axis or in the circumferential direction.

23. The method as claimed in claim 21, wherein the rollers have indentations and protrusions of different shapes.

24. The method as claimed in claim 20, wherein the rollers are moved relative to the foam which is fixedly located.

25. The method as claimed in claim 20, wherein the foam is moved relative to the rollers which are fixedly located.

26. The method as claimed in claim 20, including the step of controlling spacing between the rollers or plates and the foam to control fluid expression from or fluid distribution in the foam.

27. The method as claimed in claim 26, including the steps of controlling spacing between the rollers to alternatively express and distribute fresh sorbent, wherein fresh sorbent is applied either adjacent the top of the foam or ahead of the moving rollers between fluid expression and fluid distribution steps.

28. The method as claimed in claim 27, wherein the rollers are moved in a downward direction relative to the foam in a fluid extraction step, and in an upward direction relative to the foam in a fluid distribution step.

29. The method as claimed in claim 27, wherein the foam is moved in an upward direction relative to the rollers in the fluid extraction step, and in a downward direction relative to the rollers in the fluid distribution step.

30. The method as claimed in claim 27, including the step of returning the rollers to their up-position without substantially compressing the foam after said fluid distribution step.

31. The method as claimed in claim 19, wherein a continuous loop of foam is supported between opposing rollers, and wherein one end of the loop is immersed in a liquid sorbent bath and the foam loop is driven by the rollers so as to be refreshed with fresh sorbent from the bath while spent sorbent is removed from the foam.

32. The method as claimed in claim 1, including the step of adding surfactants to the sorbent to adjust fluid retention of the foam.

* * * * *

UNITED STATES PATENT AND TRADEMARK OFFICE
CERTIFICATE OF CORRECTION

| | | |
|---|---|---|
| PATENT NO. | : 7,655,069 B2 | Page 1 of 1 |
| APPLICATION NO. | : 11/346522 | |
| DATED | : February 2, 2010 | |
| INVENTOR(S) | : Wright et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Twenty-third Day of November, 2010

David J. Kappos
*Director of the United States Patent and Trademark Office*